US011998929B2

(12) United States Patent
Rohde et al.

(10) Patent No.: US 11,998,929 B2
(45) Date of Patent: Jun. 4, 2024

(54) COMBINATION OF CARRIER-MAGNETIC-SEPARATION AND A FURTHER SEPARATION FOR MINERAL PROCESSING

(71) Applicant: BASF SE, Ludwigshafen am Rhein (DE)

(72) Inventors: Wolfgang Rohde, Ludwigshafen am Rhein (DE); David Johann Gilbert, Villach (AT); Bernhard Schuler, Ludwigshafen am Rhein (DE); Oliver Kuhn, Ludwigshafen am Rhein (DE); Michael Mentges, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/268,160

(22) PCT Filed: Aug. 6, 2019

(86) PCT No.: PCT/EP2019/071106
§ 371 (c)(1),
(2) Date: Feb. 12, 2021

(87) PCT Pub. No.: WO2020/035352
PCT Pub. Date: Feb. 20, 2020

(65) Prior Publication Data
US 2021/0316316 A1    Oct. 14, 2021

(30) Foreign Application Priority Data
Aug. 13, 2018   (EP) .................................. 18188665

(51) Int. Cl.
*B03C 1/30* (2006.01)
*B03B 9/00* (2006.01)
*B03C 1/00* (2006.01)
*B03C 1/01* (2006.01)
*B03D 1/02* (2006.01)

(52) U.S. Cl.
CPC .................. *B03C 1/30* (2013.01); *B03B 9/00* (2013.01); *B03C 1/002* (2013.01); *B03C 1/01* (2013.01); *B03D 1/023* (2013.01); *B03C 2201/18* (2013.01)

(58) Field of Classification Search
CPC .. B03C 1/30; B03C 1/002; B03C 1/01; B03C 2201/18; B03C 3/00; B03B 9/00; B03D 1/023; B01D 21/0009
USPC .......................................................... 209/39
See application file for complete search history.

(56) References Cited

U.S. PATENT DOCUMENTS

| | | | | |
|---|---|---|---|---|
| 3,905,556 A | * | 9/1975 | Drage ..................... | B02C 23/14 241/DIG. 38 |
| 5,161,694 A | * | 11/1992 | Yoon ......................... | B03C 1/01 44/624 |
| 5,656,174 A | * | 8/1997 | Hodges .................. | B01D 36/04 210/705 |
| 5,868,255 A | * | 2/1999 | McGaa ..................... | C22B 1/00 209/214 |
| 6,540,088 B2 | * | 4/2003 | Oder ....................... | B03C 7/006 209/128 |
| 7,367,456 B2 | * | 5/2008 | Oder ......................... | B03C 1/30 209/478 |
| 8,318,025 B2 | * | 11/2012 | Domke ................... | B03C 1/015 210/695 |
| 8,322,639 B2 | * | 12/2012 | Gitschel .................... | B03C 1/30 241/24.22 |
| 8,360,242 B2 | * | 1/2013 | Valerio ..................... | B03B 5/28 209/19 |
| 8,397,918 B2 | * | 3/2013 | Langenbeck ......... | B01D 21/267 209/44 |
| 8,434,623 B2 | * | 5/2013 | Domke ................. | H01F 1/0054 209/46 |
| 8,475,662 B2 | * | 7/2013 | Domke ................... | B03C 1/032 210/695 |
| 8,486,270 B2 | * | 7/2013 | Rieger ...................... | B03C 1/01 210/695 |
| 8,584,862 B2 | * | 11/2013 | Danov ...................... | B03C 1/01 423/151 |

(Continued)

FOREIGN PATENT DOCUMENTS

| CN | 107469924 A | * | 12/2017 | ............. B02C 23/02 |
|---|---|---|---|---|
| CN | 107737668 A | * | 2/2018 | |

(Continued)

OTHER PUBLICATIONS

European Search Report for EP Patent Application No. 18188665.6, dated Dec. 12, 2018, 3 pages.

(Continued)

*Primary Examiner* — Gene O Crawford
*Assistant Examiner* — Muhammad Awais
(74) *Attorney, Agent, or Firm* — Faegre Drinker Biddle & Reath LLP

(57) ABSTRACT

A process for concentrating desired particles containing a carrier-magnetic-separation with the following steps, providing a feedstock which contains the desired particles; adding hydrophobic magnetic particles to the feedstock which results in a loaded feedstock containing agglomerates of the magnetic particles and the desired particles or of the magnetic particles and the undesired material; separating the agglomerates from the loaded feedstock by a separation method which results in isolated agglomerates, breaking up the isolated agglomerates to obtain a suspension having magnetic particles in de-agglomerated form; and separating the magnetic particles from the suspension obtained in step d) by a separation method and provided that at least one separation method is a magnetic separation, and where the process has at least one further separation and where the further separation is s sorting, electric separation, screening, classification, gravity concentration, and flotation.

17 Claims, No Drawings

(56) References Cited

U.S. PATENT DOCUMENTS

| | | | | |
|---|---|---|---|---|
| 8,640,876 | B2* | 2/2014 | Danov | F27B 7/34 |
| | | | | 209/11 |
| 8,662,310 | B2* | 3/2014 | Murray | C22B 1/00 |
| | | | | 209/423 |
| 2008/0011650 | A1* | 1/2008 | Lewis-Gray | B03C 1/12 |
| | | | | 209/39 |
| 2011/0162956 | A1* | 7/2011 | Danov | B03C 1/30 |
| | | | | 422/186.01 |
| 2014/0332449 | A1* | 11/2014 | Nishijima | B03C 1/0335 |
| | | | | 209/39 |
| 2017/0274389 | A1* | 9/2017 | Shishkov | B03C 1/01 |
| 2018/0111131 | A1* | 4/2018 | Filmer | B03D 1/10 |

FOREIGN PATENT DOCUMENTS

| | | | | |
|---|---|---|---|---|
| CN | 107737718 A | * | 2/2018 | |
| DE | 102010023130 A1 | | 12/2011 | |
| DE | 202011104707 U1 | | 12/2011 | |
| DE | 102010061952 A1 | | 5/2012 | |
| DE | 102012111425 A1 | * | 9/2013 | B03B 1/04 |
| KR | 20170104889 | * | 9/2017 | |
| KR | 20170104889 A | * | 9/2017 | |
| WO | 2009/030669 A2 | | 3/2009 | |
| WO | 2010/066770 A1 | | 6/2010 | |
| WO | WO-2010066770 A1 | * | 6/2010 | B03C 1/01 |
| WO | 2011/023426 A1 | | 3/2011 | |
| WO | 2011/107353 A1 | | 9/2011 | |
| WO | 2011/131411 A1 | | 10/2011 | |
| WO | 2011/134710 A1 | | 11/2011 | |
| WO | 2011/154178 A1 | | 12/2011 | |
| WO | 2011/154540 A1 | | 12/2011 | |
| WO | WO-2011154540 A1 | * | 12/2011 | B03C 1/01 |
| WO | 2012/072615 A1 | | 6/2012 | |
| WO | WO-2012072615 A1 | * | 6/2012 | B03B 1/01 |
| WO | 2012/104292 A1 | | 8/2012 | |
| WO | 2012/107274 A1 | | 8/2012 | |
| WO | 2012/116909 A1 | | 9/2012 | |
| WO | 2013/167634 A1 | | 11/2013 | |
| WO | 2015/104324 A1 | | 7/2015 | |
| WO | 2015/110555 A1 | | 7/2015 | |
| WO | WO-2015104324 A1 | * | 7/2015 | B01D 21/0009 |
| WO | WO-2015106871 A1 | * | 7/2015 | B03C 1/002 |
| WO | 2016/083491 A1 | | 6/2016 | |
| WO | 2017/102512 A1 | | 6/2017 | |
| WO | WO-2017102512 A1 | * | 6/2017 | B03C 1/01 |
| WO | WO-2018160806 A1 | * | 9/2018 | B03D 1/023 |

OTHER PUBLICATIONS

International Search Report and Written Opinion received for PCT Patent Application No. PCT/EP2019/071106, dated Aug. 22, 2019, 8 pages.

\* cited by examiner

COMBINATION OF CARRIER-MAGNETIC-SEPARATION AND A FURTHER SEPARATION FOR MINERAL PROCESSING

CROSS-REFERENCE TO RELATED APPLICATIONS

This application is a national stage application (under 35 U.S.C. § 371) of PCT/EP2019/071106, filed Aug. 6, 2019, which claims benefit of European Application No. 18188665.6, filed Aug. 13, 2018, both of which are incorporated herein by reference in their entirety.

The present invention relates to a process for concentrating desired particles comprising a carrier-magnetic-separation comprising the following steps a) providing a feedstock which contains the desired particles and an undesired material; b) adding hydrophobic magnetic particles to the feedstock which results in a loaded feedstock containing agglomerates of the magnetic particles and the desired particles or of the magnetic particles and the undesired material; c) separating the agglomerates from the loaded feedstock by a separation method which results in isolated agglomerates, where the separation method is selected from sorting, electric separation, magnetic separation, screening, classification, gravity concentration, and flotation; d) breaking up the isolated agglomerates to obtain a suspension comprising the magnetic particles in desagglomerated form; and e) separating the magnetic particles from the suspension obtained in step d) by a separation method selected from sorting, electric separation, magnetic separation, screening, classification, gravity concentration, and flotation; and f) optionally re-introducing the magnetic particles obtained in step e) to step b); provided that at least one separation method of steps c) or e) is a magnetic separation, and where the process comprises at least one further separation before or after the steps a), b), c), d) or e), and where the further separation is selected from sorting, electric separation, screening, classification, gravity concentration, and flotation.

In mineral processing and mining there are usually many separation steps required from the starting ore to the final mineral product. The concentration separations are usually carried out in stages called roughing, scavenging and cleaning.

A carrier-magnetic-separation is known in the art:

WO 2009/030669 describes the basic principle of such a carrier-magnetic-separation where the carrier particles are hydrophobically coated magnetic particles. These carrier particles agglomerate with mineral particles that are selectively modified by a surface active reagent. The agglomerates are separated by a magnetic field. The separated agglomerates are split into the mineral particles and carrier particles, the latter may be separated by a magnetic field and recycled into the carrier-magnetic-separation process.

Similar WO 2011/023426 discloses a carrier-magnetic-separation followed by a desagglomeration of the separated agglomerates by a water immiscible liquid from which the carrier particles can be separated.

WO 2011/154540 discloses a carrier-magnetic-separation after separating magnetic particles contained in the feed of the carrier-magnetic-separation process by applying a magnetic field.

WO 2017/102512 discloses a carrier-flotation with magnetic carrier-particles, where the magnetic agglomerate is separated by flotation and afterwards desagglomerated and the magnetic carrier-particles are separated by a magnetic field.

WO 2010/066770 discloses a carrier-magnetic-separation of tailings which contain 0.001 to 1.0 wt % of a valuable, where the tailings result from flotation, or where the tailings are slimes.

WO 2012/0772615 discloses a carrier-magnetic-separation of a slag, which was ground and optionally sieved.

WO 2016/083491 discloses a carrier-magnetic-separation, where the separated magnetic fraction is redispersed and a second magnetic fraction separated by a magnetic field, flotation, dense media separation, gravity separation, or spiral concentrator is obtained.

WO 2015/104324 discloses an agglomeration of magnetic carrier particles with a hydrophobic first particle followed by a separation of the second material, such as oxidic or hydroxidic hydrophilic metal compounds, where the separation is due to the different settling velocity under gravitation compared to the magnetic agglomerates, followed by a magnetic separation of the said agglomerates.

There is an ongoing need to improve mineral processing, and especially carrier-magnetic-separation in order to increase the process efficiency, reduce the concentration of undesired material, remove slimes, reduce the required process energy, reduce the amount of toxic chemicals.

The object was achieved by process for concentrating desired particles comprising a carrier-magnetic-separation comprising the following steps,
- a) providing a feedstock which contains the desired particles and an undesired material;
- b) adding hydrophobic magnetic particles to the feedstock which results in a loaded feedstock containing agglomerates of the magnetic particles and the desired particles or of the magnetic particles and the undesired material;
- c) separating the agglomerates from the loaded feedstock by a separation method which results in isolated agglomerates, where the separation method is selected from sorting, electric separation, magnetic separation, screening, classification, gravity concentration, and flotation;
- d) breaking up the isolated agglomerates to obtain a suspension comprising the magnetic particles in desagglomerated form; and
- e) separating the magnetic particles from the suspension obtained in step d) by a separation method selected from sorting, electric separation, magnetic separation, screening, classification, gravity concentration, and flotation; and
- f) optionally re-introducing the magnetic particles obtained in step e) to step b); provided that at least one separation method of steps c) or e) is a magnetic separation, and where the process comprises at least one further separation before or after the steps a), b), c), d) or e), and where the further separation is selected from sorting, electric separation, screening, classification, gravity concentration, and flotation.

In another form the further separation is selected from sorting.

In another form the further separation is selected from gravity concentration.

In another form the further separation is selected from flotation.

In another form the further separation is selected from screening

In another form the further separation is selected from classification.

In another form the further separation is selected from electric separation.

In another form the further separation is selected from sorting, electric separation (e.g. electro-sorting), gravity concentration, flotation, screening, and classification.

In another form the further separation is selected from sorting and classification.

In a preferred form the further separation is made before the step a).

In a preferred form the further separation is made before the agglomeration step b).

In another form the further separation is made in between the agglomeration step b) and the desagglomeration step d).

In another form the further separation is made after the desagglomeration step d).

Preferably, the further separation is made before the step b), in between the step b) and the step d), or after the step d).

In another preferred form the further separation is selected from sorting, which is made before the agglomeration step b).

In another preferred form the further separation is selected from gravity concentration, which is made before the agglomeration step b).

In another preferred form the further separation is selected from gravity concentration, which is made after the separation step e).

In another preferred form the further separation is selected from gravity concentration (preferably gravitiy concentration excluding elutriation), which is made after step b) thus, it is performed as one of the steps c) or e) alone or in combination with other separation methods from the list given above.

In another preferred form the further separation is selected from gravity concentration, which is made before the agglomeration step b), after the separation step e), or after step b), and optionally the gravity concentration is excluding elutriation.

In another preferred form the further separation is selected from flotation, which is made before the agglomeration step b).

In another preferred form the further separation is selected from flotation, which is made after the separation step e).

In another preferred form the further separation is selected from flotation, which is made after step b) thus, it is performed as one of the steps c) or e) alone or in combination with other separation methods from the list given above.

In another preferred form the separation method in step c) is selected from sorting, electric separation, magnetic separation, screening, classification, gravity concentration, and where in case the further separation is flotation then the flotation is not made in step c) or not between step c) and step d).

In another preferred form the further separation is selected from flotation under the provision that the flotation is not made in step c) or not between step c) and d).

In another preferred form the further separation is selected from screening, which is made before the agglomeration step b).

In another preferred form the further separation is selected from screening, which is made after the separation step e).

In another preferred form the further separation is selected from screening, which is made after step b) thus, it is performed as one of the steps c) or e) alone or in combination with other separation methods from the list given above In another preferred form the further separation is selected from screening, which is made before the agglomeration step b), after the separation step e) or after step b).

In another preferred form the further separation is selected from classification, which is made before the agglomeration step b).

In another preferred form the further separation is selected from classification, which is made after the separation step e).

In another preferred form the further separation is selected from classification, which is made after step b) thus, it is performed as one of the steps c) or e) alone or in combination with other separation methods from the list given above In another preferred form the further separation is selected from classification, which is made before the agglomeration step b), after the separation step e), or after step b).

In another preferred form the further separation is selected from electric separation (electrosorting), which is made before the agglomeration step b).

In another preferred form the further separation is selected from
- sorting, which is made before step b), after step e) and/or in between step b) and e),
- gravity concentration, which is made before step b), after step e) and/or in between step b) and e) electric separation, which is made before step b), after step e) and/or in between step b) and e),
- screening, which is made before step b), after step e) and/or in between step b) and e), and
- classification, which is made before step b), after step e) and/or in between step b) and e).

The separation methods in steps c) and e) and the further separation may comprise identical or different processes.

The gravity concentration is usually achieved with
- jigs (e.g. Harz jig, IHC radial jig, in line pressure jig, Denver mineral jig, air-pulsated jig)
- spiral concentrators (e.g. Humpreys spiral, souble start spiral concentrator),
- shaking tables (e.g. sand tables, slime tables, Duplex concentrator, Mozley laboratory separator),
- centrifugal concentrators (e.g. Kelsey centrifugal jig, Knelson concentrator, Falcon concentrator, multi-gravity separator)
- sluices (e.g. pinched sluiced),
- cones (e.g. Reichert cone),
- fluidized bed separators (e.g. CrossFlow separator, Reflux Classifier), or
- dense medium separators (e.g. gravitational vessels like drum separators, Wemco cone separator, Drewboy bath, Norwalt washer; centrifugal separators like dense medium cyclones, water-only cyclones, Vorsyl separator, large coal dense medium separator, Dyna whirlpool separator, Tri-Flo separator), or
- elutriators (e.g. teetered bed separator, Floatex density separator, HydroFloat separator, allflux separator).

The flotation is usually achieved with
- mechanical flotation machines (e.g. self-aerated or forced air),
- pneumatic flotation machines,
- hybrid flotation machines,
- flotation columns,
- reactor/separator flotation machines,
- flash flotators,
- Hydrofloat separator, or
- Stack cells.

The sorting is usually achieved by hand or sensor based sorting, where the sensor type is selected from color in visible light, ultraviolet, gamma radiation, neutron radiation, conductivity, X-ray fluorescence, X-ray luminiscence, infrared, Raman, or microwave attenuation.

The electric separation is usually achieved by charging via ion or electron bombardment, conductive induction, or triboelectric charging.

Both sorting and electric separation are usually performed without dispersion media, i.e. in a dry state. Therefore these techniques are preferably employed to sort the feed material before it is dispersed in for example water for further processing or to sort the product of any wet separtion process after it has been dried.

The magnetic separation is usually achieved by low-intensity, medium-intensity, high-intensity, high-gradient, or superconducting magnetic separators.

The classification is usually achieved with centrifugal classifiers (also called hydrocyclone) or gravitational classifier, such as sedimentation classifier, counter flow classifier, or air cbelassifier.

The screening is usually achieved with vibrating screens, static grizzlies, Mogensen Divergators, trommes, bradford breaker, roller screens, flip-flow screen, rotaspiral, Pansep screen, sieve bends, or tumbler screens.

In mineral processing there are usually many separation steps from the starting ore to the final product. The concentration separations are usually carried out in stages called roughing, scavenging and cleaning. The process according to the invention may be used in roughing, scavenging and cleaning.

The invention further relates to a use of the process in mineral processing for roughing, scavenging or cleaning of the mineral.

The first stage in a separation is often roughing and produces a concentrate (the valuable product) and a tail (rejects). The main objective of the roughing is to enrich the valuable material as much as possible with the lowest losses. The rougher tails may be treated in scavengers to recover additional mineral values. Scavenger tails may constitute the final plant tails or feed to another separation circuit. The rougher and scavenger concentrates can be combined or treated separately. For many ores, the scavenger concentrate usually represents the middlings or unliberated or partially liberated particles and, therefore, may require further grinding before treatment. Even the rougher concentrate may require further grinding before it enters the cleaning circuit. There may be additional stages such as cleaning of a scavenger product, scavenging of a cleaner product, or recleaning of a cleaner product. Recovery is typically the primary objective in both roughers and scavengers; grade is often the primary objective of cleaners. Between different stages solid-liquid separation stages may be necessary such as thickening or filtering.

In a preferred form the process according to the invention is used in roughing.

In a preferred form the process according to the invention is used in scavenging.

In a preferred form the process according to the invention is used in cleaning.

In a preferred form the process according to the invention is used in a process comprising roughing, scavenging and cleaning.

In a preferred form the further separation is selected from flotation and is made before step b) or after step e).

In another preferred form the further separation is selected from sorting and is made before step b), e.g. with a feedstock obtained from grinding.

In another preferred form the further separation is selected from classification and is made before step b), e.g. with a feedstock obtained from grinding.

In another preferred form the further separation is selected from gravity concentration and is made before step b).

The carrier-magnetic-separation process of the present invention is herein also called CMS. The CMS comprises the steps a), b),c),d) and e), and optionally f) preferably in the given order.

Step a) comprises providing a feedstock which contains the desired particles and an undesired material.

The feedstock comprises typically at least 0.01 wt %, preferably at least 0.5 wt %, more preferred at least 1 wt % and in particular at least 5 wt % desired particles. The feedstock comprises typically 2 to 99 wt % desired particles, preferably 10 to 80 wt % desired particles.

The desired particles comprise usually a desired compound and optionally undesired material. Usually, the desired particles comprise at least 50 wt %, preferably at least 70 wt %, and in particular at least 90 wt % desired compound. In another form the desired particles essentially consist of desired compound.

The desired particles have in general an average diameter that enables this particle to efficiently agglomerate with the magnetic particles. In a preferred embodiment, the desired particle has a $D_{50}$ of from 1 nm to 1 mm, and preferably of from 0.1 μm to 500 μm and most preferred in the range between 1 μm and 250 μm. The average diameter of the desired particles may be determined by Laser Diffraction Measurement, e.g. Laser Diffraction Measurement using a Mastersizer 2000 or 3000 with software version 5.12G, wherein the sample is dispersed in water or an alcohol. The particle size of the desired particles, can be reduced prior use by grinding or milling.

Suitable desired compounds are any compounds which should be concentrated by the carrier-magnetic-separation. Preferably, desired compounds are metal compounds. Suitable desired compounds are sulfidic ore minerals, oxidic ore mineral, carbonate-comprising ore minerals, metals in elemental form, alloys comprising metals, compounds comprising metals and mixtures thereof.

Preferably, the desired compound comprises a metal such as Ag, Au, Pt, Pd, Rh, Ru, Ir, Os, Cu, Mo, Ni, Mn, Zn, Pb, Te, Sn, Hg, Re, V, Fe or mixtures thereof, preferably in the native state or as alloys, sulphides, phosphides, selenides, arsenides, tellurides or ore minerals thereof.

In another preferred form the desired compound is an ore minerals, such as sufidic ore minerals (e.g. pyrite ($FeS_2$), galena (PbS), braggite (Pt,Pd,Ni)S, argentite ($Ag_2S$) or sphalerite (Zn, Fe)S), oxidic and/or carbonate-comprising ore minerals (e.g. azurite $[Cu_3(CO_3)_2(OH)_2]$ or malachite $[Cu_2[(OH)_2|CO_3]]$), or rare earth metals comprising ore minerals (e.g. bastnaesite (Y, Ce, La)$CO_3$F, monazite (RE)$PO_4$ (RE=rare earth metal) or chrysocolla $(Cu,Al)_2H_2Si_2O_5(OH)_4 \cdot n\, H_2O$).

In another preferred form the desired compound is a sulfidic ore minerals such as copper ore minerals comprising covellite CuS, molybdenum(IV) sulfide, chalcopyrite (cupriferous pyrite) $CuFeS_2$, bornite $Cu_5FeS_4$, chalcocite (copper glance) $Cu_2S$ or pentlandite $(Fe,Ni)_9S_8$.

Suitable undesired material may contain a hydrophilic metal compound or a hydrophilic semimetal compound. The undesired material may comprise metal oxide or semimetaloxides, carbonate comprising metal or semimetal compounds, silicate comprising metal or semimetal compounds, sulfidic metal or semimetal compounds, hydroxidic metal or semimetal compounds or mixtures thereof. These materials may be present as minerals ceramics or glasses.

Typical metal oxides or semimetal oxides include, but are not limited to, silicon dioxide ($SiO_2$), silicates, aluminosilicates, such as feldspars, albite ($Na(Si_3Al)O_8$), mica, for example muscovite ($KAl_2[(OH,F)_2AlSi_3O_{10}]$), garnets (Mg, Ca, $Fe^{II})_3(Al, Fe^{III})_2(SiO_4)_3$ and further related minerals and mixtures thereof. The undesired material may be selected from $SiO_2$, CaO, $Al_2O_3$, MgO, $P_2O_5$, $ZrO_2$, $Fe_2O_3$, $Fe_3O_4$, $CeO_2$, $Cr_2O_3$, complex oxide matrices and mixtures thereof.

The feedstock may be a dispersion, preferably an aqueous dispersion. The term dispersion may include a suspension and a suspoemulsion. The continuous phase of the dispersion comprises usually at least 50 wt %, preferably at least 70 wt %, and in particular at least 90 wt % of water. The dispersion may have a solid content of 3 to 50 wt %, preferably of 10 to 30 wt %. The term "dispersion" refers to material comprising more than one phase wherein at least one of the phases consists of finely divided phase domains, often in the colloidal size range, dispersed throughout a continuous phase.

In case that the feed contains magnetic ore particles these may be separated by a magnetic separation before step (b).

The feedstock may further contain a collector. A suitable collector selectively forms a hydrophobic layer on the desired particles. Collectors are widely known for their use in mineral processing. The collector may be a non-ionic collector, an ionic collector (such as an anionic or cationic collector), a amphoteric collector or a chelating collector (e.g. hydroxamates). Preferably, the collector is a non-ionic collector or a anionic collector.

Suitable non-ionic collector are preferably liquid, non-polar compounds that do not dissociate in water. Preferably, the non-ionic collector is a hydrocarbon. The hydrocarbon may be a uniform hydrocarbon or a hydrocarbon mixture. The hydrocarbons may have a viscosity of from 0.1 to 100 cP, preferably from 0.5 to 5 cP, in each case at 20° C. The hydrocarbon may be mineral oils, vegetable oils, biodiesel, BtL (Biomass-to-Liquid) fuels, products of coal liquefaction, products of the GtL (Gas to Liquid, from natural gas) process, long chain alcohols, and mixtures thereof. The collector is preferably a mineral oil. Suitable mineral oils are crude oil derivatives and/or oils produced from brown coal, hard coal, peat, wood, petroleum and, if appropriate, other mineral raw materials by distillation. Mineral oils generally comprise hydrocarbon mixtures of paraffinic hydrocarbons, i.e. saturated linear and branched hydrocarbons, naphthenic hydrocarbons, i.e. saturated cyclic hydrocarbons, and aromatic hydrocarbons.

Suitable anionic collectors are sulfhydryl collectors (like xanthates, dithiophosphates, dithiophosphinates, trithiocarbonates, mercaptobenzothiazoles, dithiocarbamates, mercaptans, xanthogen formates, or monothiophosphates) or oxyhydryl collectors (like fatty acids, alkyl sulfates, or alkyl sulfonates, sulfosuccinamates, phosphonic acid, or phosphoric acid esters).

Suitable cationic collectors are quaternary amine or amine ether collectors, derived from $C_8$-$C_{24}$ fatty amines or amine ethers or esters (esterquats)

The feedstock comprises typically up to 15 wt %, preferably up to 7 wt %, and in particular up to 4 wt % of the collector (e.g. the mineral oil) based on dry mass of the feedstock. In another form the feedstock comprises typically 0.001 to 10 wt %, preferably 0.1 to 5 wt %, and in particular 0.2 to 3 wt % of the collector (e.g. the mineral oil) based on dry mass of the feedstock. In another form the feedstock comprises typically at least 0.05 wt %, preferably at least 0.1 wt %, and in particular at least 0.3 wt % of the collector (e.g. the mineral oil) based on dry mass of the feedstock.

The collector may be added to the feedstock in the desired amount, or it may be already present in the feedstock from other process steps. For example, the collector may originate from waste oils contained in the waste stream e.g. from motors, hydraulic devices or cooling liquids or transformer liquids. Preferably, the collector is added to the feedstock in the desired amount.

The feedstock comprising the collector may be mixed, e.g. with stirrers, rotor-stator-mixers circular pumping systems, or static mixtures within a flow of the mixture. Typically the mixing is done at specific mixing energies in the range of 0.1 to 1000 kWh/m$^3$ preferably in the range of 1 to 700 kWh/m$^3$. The mixing of the feedstock with the collector can be performed in a mill, preferably the collector is added to the feedstock during a grinding process.

Step b) comprises adding hydrophobic magnetic particles to the feedstock which results in a loaded feedstock containing agglomerates of the magnetic particles and the desired particles or of the magnetic particles and the undesired material.

Suitable magnetic particles may be selected from of magnetic metals, preferably iron and its alloys, cobalt, nickel and mixtures thereof; ferromagnetic or ferrimagnetic alloys of magnetic metals, for example NdFeB, SmCo and mixtures thereof; magnetic iron oxides, for example magnetite, magnetic hematite, hexagonal ferrites; cubic ferrites; and mixtures thereof. Preferably, the magnetic particle is a magnetic iron oxide, in particular magnetite.

The magnetic particles have in general an average diameter that enables this particle to efficiently agglomerate with the desired particles. In a preferred embodiment, the magnetic particle has a $D_{50}$ of from 1 nm to 1 mm, and preferably of from 0.1 μm to 50 μm and most preferred in the range between 1 μm and 20 μm. The wording "$D_{50}$" means that 50% by weight of the corresponding particles have a diameter that is smaller than the mentioned value. The average diameter of the magnetic particles may be determined by Laser Diffraction Measurement, in particular Laser Diffraction Measurement using a Mastersizer 2000 with software version 5.12G, wherein the sample is dispersed in an aqueous solution of $Na_4P_2O_7$. The particle size of the magnetic particles, such as the magnetite, can be reduced prior use by grinding or milling.

In general, the amount of the magnetic particles to be applied in the method of the present invention can be determined in a way that advantageously the whole amount of the desired particles can be separated by agglomerating with the magnetic particles. In a preferred embodiment, the magnetic particles are added in an amount of from 0.01 to 100% by weight, preferably from 0.1 to 20% by weight, particularly preferably from 0.5 to 10% by weight and most preferably 1 to 5% by weight, based on the weight of the dry desired particles and undesired material.

The magnetic particle is a hydrophobic magnetic particle. Usually, the magnetic particle is hydrophobized on its surface, i.e. is a hydrophobized magnetic particle. Preferably, the magnetic particle has been hydrophobized by treatment with a hydrophobizing agent, wherein preferably the magnetic particle treated with the hydrophobizing agent has a contact angle between the particle surface and water against air of preferably more than 30°, more preferably more than 60°, even more preferably more than 90° and particularly preferably more than 140°. Preferably, the magnetic particle has been pre-treated with the hydrophobizing agent before adding to the feedstock.

In general, the hydrophobizing agent may be any agent that will render the surface of the magnetic particle more hydrophobic than the surface of the magnetic particle before the treatment. Suitable hydrophobizing agents and methods to perpare hydrophobic magnetic particles by treatment with the hydrophobizing agents are known, such as those listed in WO 2016/083491, page 19, line 21 to page 27, line 30, or in WO2015/110555 page 7, line 9 to page 11, line 32.

Examples of hydrophobizing agents are
polyorganosiloxanes;
alkylsiliconates, e.g. alkali or earth alkali $C_{1-6}$ alkylsiliconates, in particular methylsiliconate;
alkyltrichlorosilanes, e.g. $C_{6-12}$ alkyltrichlorosilanes;
alkyltrimethoxysilanes, e.g. $C_{6-12}$ alkyltrimethoxysilanes;
alkylphosphonic acids, e.g. $C_{6-18}$ alkylphosphonic acids, in particular octylphosphonic acid;
mono- or dialkylphosphoric esters, e.g. $C_{6-18}$ mono- or dialkylphosphoric;
fatty acids, e.g. $C_{6-18}$ fatty acid, in particular lauric acid, oleic acid, stearic acid;
or mixtures thereof.

The hydrophobizing agent is preferably a polyorganosiloxane. Polyorganosiloxane (also known as silicone) have usually the formula $[R_mSi(O)_{4-m/2}]_n$ where m is from 1 to 3, n is at least 2, and R an organic rest, such as methyl, ethyl, or phenyl. The polyorganosiloxanes may be linear, cyclic or branched. Suitable polyorganosiloxanes and their preparation are known form Ullmann's Encyclopedia of Industrial Chemistry, Volume 32, Entry "Silicones", Wiley-VCH, 2012, page 675-712.

Suitable polyorganosiloxanes are silicon oil, silicon rubber, silicon resin, or block and graft polyorganosiloxane copolymers, wherein silicon oil and silicon resin are more preferred.

Silicon oil (also known as silicon fluids) are usually linear polyorganosiloxanes with typically 2 to 4000 monomer units. Suitable silicon oils are methylsilicone oil, methylphenylsilicon oil, fluorsilicone oil, methylhydrogensilicon oil, or methylalkylsilicone oil. Preferred silicon oils are methylsilicone oil and methylphenylsilicon oil.

Suitable methylsilicone oil are linear polydimethylsiloxanes, which may have a molecuar mass from 500 to 200,000 g/mol. Suitable methylphenylsilicone oil are linear polydimethylsiloxanes, where the methyl groups are partly substituted by phenyl groups, and which may have a molecuar mass from 500 to 200,000 g/mol.

Silicone resins are typically branched polyorganosiloxanes with a molecular weight of below 15,000 g/mol, preferably below 10,000 g/mol. Silicone resins are usually soluble in organic solvents, such as toluene. Preferred silicone resins are MQ, TD and T type silicone resins. Typically, silicone resins are prepared by hydrolysis or alcoholysis of organochlorosilanes, such as methyltrichlorosilane, phenyltrichlorosilane, dimethyldichlorosilane, and diphenyldichlorosilane.

Preferably, the hydrophobizing agent is a silicone resin, such as a branched polyorganosiloxanes with the formula $[R_mSi(O)_{4-m/2}]_n$ where m is from 1.1 to 3, n is at least 10, and R an organic rest, such as methyl or phenyl with a molecular mass below 10,000 g/mol.

Suitable block and graft polyorganosiloxane copolymers are polyorganosiloxane-polyether block polymers, where the polyether block may contain polyethylene glycol and/or polypropylene glycol; or graft polymers of polyorganosiloxane with vinyl monomers, such as styrene, acrylate, or vinyl acetate).

The addition of the hydrophobic magnetic particles to the feedstock results in a loaded feedstock, which contains agglomerates of the magnetic particles, the desired particles and optionally the collector, or agglomerates of the magnetic particles, the undesired material, and optionally the collector.

The loaded feedstock is may be a dispersion, preferably an aqueous dispersion. The continuous phase of the dispersion comprises usually at least 50 wt %, preferably at least 80 wt %, and in particular at least 90 wt % of water. The dispersion may have a solid content of 3 to 50 wt %, preferably of 10 to 45 wt %. Usually when the feedstock was a dispersion, then the loaded feedstock is also a dispersion. Preferably the feedstock and the loaded feedstock are aqueous dispersion.

The feedstock or the loaded feedstock may also include further materials. These additional materials may comprise any additive known by the skilled person to be used to improve the dispersion of the particles their surface charges and the chemical properties of the dispersing medium (e.g. the pH-value and the redox-potential). The pH-value of the aqueous dispersion of the feedstock or the loaded feedstock may typically be from about 2 to about 13 and preferably from about 4 to about 12.

Steps a), to e) may be carried out at a temperature from about 10 to about 80° C. and preferably at ambient temperature.

The input of mechanical energy, preferably mechanical shear energy, in step b) may be helpful in the formation of the agglomerates.

The transfer of mechanical energy may be achieved by any device. For example the transfer of mechanical energy may be achieved by a single stirrer or stirrer arrangement. In addition or alternatively, the transfer of mechanical energy may be achieved by a flow generator, e.g. a pump, generating a turbulent flow in the mixing vessel by means of which turbulent flow the mechanical energy may be transferred into the mixture of the dispersion medium, first type particles, second type particles and magnet type particles.

The mechanical shear energy can be introduced in step b) by different means. Typically it is done by a stirred vessel that may contain baffles to render the energy up take more efficient. Other means are milling aggregates like ball mills or any type of stirred ball mills. Also the use of rotor stator mixing devices is possible; or to pump the content of a vessel containing the loaded feedstock in a closed cycle. Provided the correct amount of energy can be introduced the turbulent flow of the dispersion through a pipe conveyed by pumps or by gravity will also yield the required agglomeration. Static mixers and counter current flow mixers are another way to introduce shear energy into the dispersion.

Agglomeration may take place in an agglomeration volume for a batch process. In this case the mixture is put into the volume and e.g. stirred until the desired agglomeration is achieved. Thereafter the mixture is released from the agglomeration volume. Agglomeration may also take place in an agglomeration volume for a continuous flow process. In this case the mixture is continuously fed to and released from the volume containing the stirrer. The desired agglomeration can be controlled by controlling the feed rate to and from the stirring volume i.e. the average residence time of the dispersion in the stirred volume. At a given stirring power the average residence time determines the shear energy up-take of the dispersion.

Step c) comprises separating the agglomerates from the loaded feedstock by a separation method which results in isolated agglomerates, where the separation method is selected from sorting, electric separation, magnetic separation, screening, classification, gravity concentration, and flotation.

In one embodiment of the present invention the separation according to step c) is performed by a magnetic field as magnetic separation.

The separation of the agglomerates by the magnetic field may be conducted by any method known to the skilled artisan. Suitable magnetic separators are drum separators, high or low intensity magnetic separators, continuous belt type separators or others. Permanent magnets or electromagnets can be used to generate the magnetic field. The magnetic separation may be performed by a continuous or semi-continuous magnetic separation technology as described by e.g. Jan Svoboda "Magnetic Techniques for the Treatment of Materials" (2004).

Suitable magnetic separators are of the LIMS (low intensity magnetic separator), MIMS (medium intensity magnetic separator) or WHIMS (wet high intensity magnetic separator) type as known in the art. In a preferred embodiment of this invention the separators are of the MIMS or WHIMS type. Typical apparatus used for the magnetic separation are disclosed in WO 2011/131411, WO 2011/134710, WO 2011/154178, DE 10 2010 023 130, DE 20 2011 104 707, WO 2011/107353, DE 10 2010 061 952, WO 2012/116909, WO 2012/107274, WO 2012/104292 or WO 2013/167634. The magnetic separator preferably further comprises at least one magnet that is movable alongside a canal through which the slurry containing the magnetisable particles flows. The magnetic separator is preferably operated in countercurrent i.e. the movement of the magnetic field is opposite to the direction of the suspension flow. The field strength of the magnetic field may be at least 0.1, preferably at least 0.3 and in particular at least 0.5 Tesla.

In a preferred embodiment, the magnetic separation equipment allows washing the agglomerate during separation with a dispersant, preferably water. The washing preferably allows removing inert material i.e. material that is not hydrophobized from the agglomerate.

This magnetic separation step can be repeated, in particular by repeated flow of the non-magnetic product of the foregoing separation step through a consecutive separation path or by modulating the magnetic field. In this consecutive separation steps (known in the art as scavenging) further amounts of collector and/or the hydrophobic magnetic particles may be added prior to the magnetic separation stage as described above for the step b). The agglomerates can be stirred after a first separation and before a second separation, so that trapped second type particles can be set free and can be separated in the second separating step (known in the art as cleaning).

In one embodiment of the present invention the separation in step c) is performed by any one or a combination of at least two separations selected from screening, classification, gravity concentration, and flotation, preferably selected from screening, classification, and gravity concentration.

The carrier-magnetic-separation further comprises step d) breaking up the isolated agglomerates to obtain a suspension comprising the magnetic particles in desagglomerated form.

The breakup of the isolated agglomerates and the separation of the desired particles from the magnetic particles are usually done in order to recycle the magnetic particles. The desired particles and the magnetic particles may be separated by applying a magnetic field. As described above with respect to the separation of the agglomerates from the loaded feedstock, also the separation of the magnetic particles and desired particles can be done once or more a plural of times, optionally with a stirring and de-trapping of trapped non-magnetic particles between separation steps.

The breakup can be achieved by adding a cleaving agent. The cleaving agent may comprise organic solvents, basic compounds, acidic compounds, oxidants, reducing agents, surfactants or mixtures thereof. Preferably, the cleaving agent comprises a mixture of water and surfactant.

Examples of organic solvents as cleaving agents are alcohols, such as methanol, ethanol, propanol, for example n-propanol or isopropanol; aromatic solvents, for example benzene, toluene, xylenes; ethers, for example diethyl ether, methyl t-butyl ether; ketones, for example acetone; aromatic or aliphatic hydrocarbons, for example saturated hydrocarbons with for example 6 to 10 carbon atoms, for example dodecane, Diesel fuel and mixtures thereof. The main components of Diesel fuel are predominantly alkanes, cycloalkanes and aromatic hydrocarbons having about 9 to 22 carbon atoms per molecule and a boiling range between 170° C. and 390° C.

The acidic compounds can be mineral acids, for example HCl, $H_2SO_4$, $HNO_3$ or mixtures thereof, organic acids, for example carboxylic acids.

As oxidants, it is possible to use $H_2O_2$, for example as 30% strength by weight aqueous solution.

Examples of basic compounds are aqueous solutions of basic compounds, for example aqueous solutions of alkali metal and/or alkaline earth metal hydroxides, such as KOH or NaOH; lime water, aqueous ammonia solutions, aqueous solutions of organic amines.

Examples of surfactants are nonionic, anionic, cationic and/or zwitterionic surfactants. In a preferred embodiment, the cleavage is made by the use of preferably biodegradable and/or nonionic surfactants in concentrations in the range of the critical micelle concentrations or above. Preferably, the cleaving agent is a nonionic surfactant added in an amount of from 0.001 to 10% by weight, preferably from 0.01 to 1% by weight, based on the weight of the total solid phase employed in step d). The surfactant concentration is preferably at least more than its critical micelle concentration (CMC), more preferably at least twice as high as its CMC.

The breakup can also be aided mechanically, such as by ultrasound or stirring or pumping in a cycle or by milling.

The carrier-magnetic-separation further comprises step e) separating the magnetic particles obtained in step d) by a separation method selected from sorting, electric separation, magnetic separation, screening, classification, gravity concentration, and flotation.

The magnetic particles which are obtained in step e) may be used to subsitute all or part of fresh magnetic particles in step b).

The carrier-magnetic-separation optionally further comprise step f) of re-introducing the magnetic particles obtained in step e) to step b).

The flow sheets of the inventive processes are complicated and therefore the control of the corresponding plants will require a sophisticated process control system comprising sensors and actuators controlled by a powerful computing system.

EXAMPLES

Example 1—Rougher

The process according to the invention may be used as rougher as shown in Scheme 1a and 1 b. The advantage of the use as rougher is that the process requires only a small area in a mining area.

Example 1a

In this example the mined ore is treated by comminution and separation operations to provide a feedstock material for step a) of the inventive process. The sequence of steps a) to f) wherein in steps c) and e) a magnetic separation is employed constitute a rougher separation. This requires that the feed provided in step a) has been treated in a way that the target material that will be agglomerated in step b) with magnetic particles has the right particle size distribution and degree of liberation i.e. that there is enough free surface of the target material available to allow the adsorption of collector agents. The treatment of the feed before step a) is done by a sequence of crushing and grinding and a further separation. This further separation can be any one or any combination of sorting, electric separation, screening, classification, gravity concentration, dense medium separation and flotation. In addition to further separations of the present invention an additional magnetic separation can be employed before step a) in cases where the ore contains magnetic or magnetizable mineral species like magnetite or pyrrhotite.

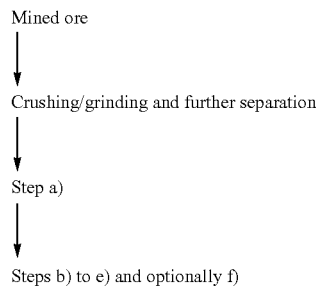

The further separation before step a) will produce a target material that ultimately will constitute the feedstock for step a) and a tailing material that is either dumped directly or is fed to further grinding and separation stages or recycled to the grinding and further separation stage before step a).

The tailings of step c) is a rougher tailing that may dumped directly or may be further treated by any concentration process known in the art or by those described in the present invention namely those of the following examples 2) (Scavenging).

The product of step e) is a rougher concentrate that may be further treated by any concentration process known in the art or by those described in the present invention namely those of the following examples 3) (Cleaning)

Example 1b

In this example the further separation that is introduced as in scheme 1a) before step a) of the inventive process produces at least two different fractions of the feed ore that may be treated in parallel at least one fraction by the process of steps a) to e) and optionally f) of which either step c) or e) or both are magnetic separations and at least one second fraction by a process selected from the further separations of the present invention and a magnetic separation. The further separation before step a) may be one that produces 2 fractions differing mainly in particle size and particle weight i.e. separations like screening, classification or gravity separations. Thus, one fraction may be better suited to a conventional flotation while the other fraction may be too fine for conventional flotation and may be advantageously processed by the process comprising steps a) to e) and optionally f). Such a process may be described by the following scheme:

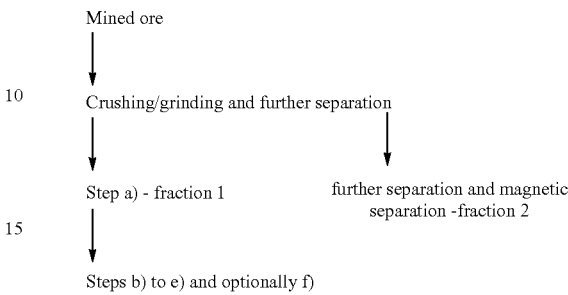

Alternatively the further separation before step a) may produce different fractions differing in the mineral composition e.g. one fraction containing predominantly mineral type 1 and the other mineral type 2. Separations that may sort according to the mineral composition are sorting, electro separation, flotation, magnetic separation and dense medium separation.

The products of step c) and e) are a rougher tailing and a rougher concentrate of one fraction respectively and a rougher tailing and a rougher concentrate of the other fraction. Both concentrates and both tailings may be further treated by any other concentration process known in the art or the inventive process namely those described in examples 2) and 3).

Example 1c

In the foregoing examples the process according to steps a) to e) and optionally f) steps c) and e) are magnetic separations. Alternatively either step c) or step e) can be further separation processes that are no magnetic separations. In step c) a flotation may be performed which is intensified by the agglomeration with magnetic particles in step b). The flotation concentrate containing these agglomerates is then introduced to step d) where the agglomerates are broken and the magnetic particles are separated by a magnetic separation in step e).

Example 1d

Another example is a process as described in examples 1 a) and 1b) where within the process steps a) to e) and optionally f) step e) is a further separation i.e. no magnetic separation. The concentrate obtained by magnetic separation in step c) will be desagglomerated in step d). The slurry obtained in step d) containing the target minerals and the magnetic particles can be processed by a flotation step relying on the hydrophobic properties of the magnetic particles which will be collected in the flotation froth.

Example 2—Scavenger

The process according to the invention may be used as scavenger. The starting material is usually a tailing from another stage and contains low concentration of the desired material. The preceeding separation stage may be any concentration process known in the art or a process of the present invention resulting in a tailing. The tailing can be treated by grinding in order to liberate so far non-liberated target minerals. The resulting material will be the feedstock provided in step a) of the inventive process. The further treatment according to steps b) to e) and optionally f) can be done analogously as described in examples 1a), 1b), 1c) and 1d).

Example 3—Cleaner

The process according to the invention may be used as cleaner. The starting material is usually a concentrate from a preceeding separation stage. Usually the corresponding feed material that will be introduced in step a) is rich in target minerals. The preceeding separation stage may be any concentration process known in the art or a process of the present invention resulting in a concentrate. The concentrate can be treated by grinding in order to liberate so far non-liberated target minerals. The resulting material will be the feedstock provided in step a) of the inventive process. The further treatment according to steps b) to e) and optionally f) can be done analogously as described in examples 1a), 1b), 1c) and 1d).

Example 4—Coarse Particle Workup

The process according to the invention may be used during coarse particle workup as shown in the following scheme. During the mineral processing often grinding/classification circuits are installed in order to optimize the liberation of the desired material. Typically, after grinding the fine particles are further processed in other steps, whereas the coarse particles are returned to grinding. Prior to the return of the coarse particles to grinding they can be concentrated by the coarse particle workup as shown in the scheme. Advantage is that coarse particles which contain no desired material are not ground again and thus the efficiency of the grinding is increased.

Example 4a

Starting material: Coarse particles resulting from grinding and classification
↓
1. Step: Coarse particles in Carrier-Magnetic-Separation step a) to c) and coarse concentrate (carrier-magnetite agglomerates) back to the mill and coarse tailing to Scavenger or dump.

Example 4b

Starting material: Coarse particles resulting from grinding and classification
↓
1. Step: Coarse particles in Carrier-Magnetic-Separation step a) to e) and optionally f) and coarse concentrate (carrier-magnetite agglomerates) back to the mill and coarse tailing to Scavenger or dump.

Example 5—Slime Workup

During the various mineral processing steps the formation of slimes may occur. Usually, such slimes are difficult to separate, and may even be disadvantagous for many separation steps because they increase foaming (Pickering effect). Slimes are preferably separated by hydrocyclones. The carrier-magnetic-separation is one of the few suitable methods for concentration of the desired material in slimes, e.g. from slimes resulting from hydrocyclones or other classification steps.

Thus, the process according to the invention may be used during slime workup as shown in the following scheme.

Starting material: Slime resulting from any separation step
↓
1. Step: Slime in Carrier-Magnetic-Separation, resulting concentration (carrier-magnetite agglomerates) go to the rougher feed or other CMS stages in the plant and Slime Tailing to dump

The invention claimed is:
1. A process for concentrating desired particles comprising a carrier-magnetic-separation comprising the following steps,
   a) providing a feedstock which contains the desired particles and an undesired material;
   b) adding hydrophobic magnetic particles to the feedstock which results in a loaded feedstock containing agglomerates of the magnetic particles and the desired particles or of the magnetic particles and the undesired material;
   c) separating the agglomerates from the loaded feedstock by a separation method which results in isolated agglomerates, where the separation method magnetic separation;
   d) breaking up the isolated agglomerates to obtain a suspension comprising the magnetic particles in de-agglomerated form; and
   e) separating the magnetic particles from the suspension obtained in step d) by a separation method selected from sorting, electric separation, magnetic separation, screening, classification, gravity concentration, and flotation; and
   f) optionally re-introducing the magnetic particles obtained in step e) to step b);
   g) provided that at least one separation method of steps c) or e) is a magnetic separation, and where the process comprises at least one further separation before or after the steps a), b), c), d) or e),
      wherein the at least one further separation is made before the agglomeration step b),
      and where the further separation is selected from the group consisting of sorting, electric separation, screening, classification, gravity concentration, and flotation
   wherein the flotation is achieved with
      mechanical flotation machines,
      pneumatic flotation machines,
      hybrid flotation machines,
      flotation columns,
      reactor/separator flotation machines,
      flash flotators,
      Hydrofloat separator, or
      Stack cells.
2. The process according to claim 1, wherein the gravity concentration is achieved with
   jigs,
   spiral concentrators,
   shaking tables, centrifugal concentrators,
sluices,
cones,
fluidized bed separators,
dense medium separators or
elutriators.

3. The process according to claim 1, wherein the gravity concentration is achieved with
- jigs selected from the group consisting of Harz jig, IHC radial jig, in line pressure jig, Denver mineral jig and air-pulsated jig,
- spiral concentrators selected from the group consisting of Humpreys spiral, soluble start and spiral concentrator,
- shaking tables selected from the group consisting of sand tables, slime tables, Duplex concentrator, and Mozley laboratory separator,
- centrifugal concentrators selected from the group consisting of Kelsey centrifugal jig, Knelson concentrator, Falcon concentrator and multi-gravity separator,
- pinched sluiced,
- Reichert cone,
- fluidized bed separators selected from the group consisting of Cross Flow separator, and Reflux Classifier,
- dense medium separators selected from the group consisting of gravitational vessels like drum separators, Wemco cone separator, Drewboy bath, Norwalt washer; centrifugal separators like dense medium cyclones, water-only cyclones, Vorsyl separator, large coal dense medium separator, Dyna whirlpool separator, and Tri-Flo separator, or
- elutriators selected from the group consisting of teetered bed separator, Floatex density separator, HydroFloat separator, and allflux separator.

4. The process according to claim 1, wherein the sorting is achieved by hand or sensor based sorting, where the sensor type is selected from color in visible light, ultraviolet, gamma radiation, neutron radiation, conductivity, X-ray fluorescence, X-ray luminescence, infrared, Raman, or microwave attenuation.

5. The process according to claim 1, wherein the electric separation is achieved by charging via ion or electron bombardment, conductive induction, or triboelectric charging.

6. The process according to claim 1, wherein the magnetic separation is achieved by low-intensity, high-intensity, high-gradient, or superconducting magnetic separators.

7. The process according to claim 1, wherein the classification is achieved with centrifugal classifiers or gravitational classifier, such as sedimentation classifier, counter flow classifier, or air classifier.

8. The process according to claim 1, wherein the screening is achieved with vibrating screens, static grizzlies, Mogensen Divergators, trommes, bradford breaker, roller screens, flip-flow screen, rotaspiral, Pansep screen, sieve bends, or tumbler screens.

9. The process according to claim 1, where in case the further separation is flotation then the flotation is not made in step c) or not between step c) and step d).

10. The process according to claim 1, wherein the further separation is made before the step b), and in between the step b) and the step d), or after the step d).

11. The process according to claim 1, wherein the further separation is gravity concentration, which is made
  i) before the agglomeration step b),
  ii) after the separation step e), or
  iii) after step b), and
  optionally the gravity concentration is excluding elutriation.

12. The process according to claim 1, wherein the further separation is screening, which is made
  i) before the agglomeration step b),
  ii) after the separation step e) or
  iii) after step b).

13. The process according to claim 1, wherein the further separation is classification, which is made
  i) before the agglomeration step b),
  ii) after the separation step e), or
  iii) after step b).

14. The process according to claim 1, wherein the further separation is sorting and is made before step b).

15. The process according to claim 1, wherein the further separation is classification and is made before step b).

16. The process according to claim 1, wherein the further separation is made before step a).

17. The process according to claim 1, wherein the further separation is selected from the group consisting of sorting and electric separation and is made in dry state before step a).

* * * * *